United States Patent [19]

Heins

[11] Patent Number: 5,008,983
[45] Date of Patent: Apr. 23, 1991

[54] PORTABLE CLEAT

[76] Inventor: Ralph C. Heins, 1313 E. Bayview Dr., Tempe, Ariz. 85283

[21] Appl. No.: 451,801

[22] Filed: Dec. 18, 1989

[51] Int. Cl.⁵ ............................................. A44B 1/04
[52] U.S. Cl. ...................................... 24/131 C; 24/18; 24/129 R; 24/129 A
[58] Field of Search ................... 24/131, 71.1, 71.2, 24/71.3, 129 R, 129 A, 115 R, 570, 18, 22, 26, 131 C, 343, 360, 363, 366

[56] References Cited

U.S. PATENT DOCUMENTS

| | | |
|---|---|---|
| D. 257,421 | 10/1980 | Cox . |
| 756,418 | 4/1904 | Seyster .......................... 24/129 R |
| 892,945 | 7/1908 | Drawe et al. ...................... 24/18 |
| 903,722 | 11/1908 | Hoover ............................ 24/131 R |
| 919,674 | 4/1909 | Andrew ........................... 24/18 |
| 2,370,358 | 2/1945 | Koch ............................ 24/129 R X |
| 2,392,648 | 1/1946 | Cushman ......................... 24/18 |
| 2,962,998 | 12/1960 | Long . |
| 3,715,782 | 2/1973 | Newell . |
| 3,939,793 | 2/1976 | Brockelsby . |

FOREIGN PATENT DOCUMENTS 323206  12/1929  United Kingdom ................... 24/18

Primary Examiner—Laurie K. Cranmer
Attorney, Agent, or Firm—Thomas R. Lampe

[57] ABSTRACT

A portable cleat including a primary connector element having a principal axis and opposed ends and a secondary connector element attached to the primary connector element at at least one of the ends, said secondary connector element having angularly disposed arms.

6 Claims, 4 Drawing Sheets

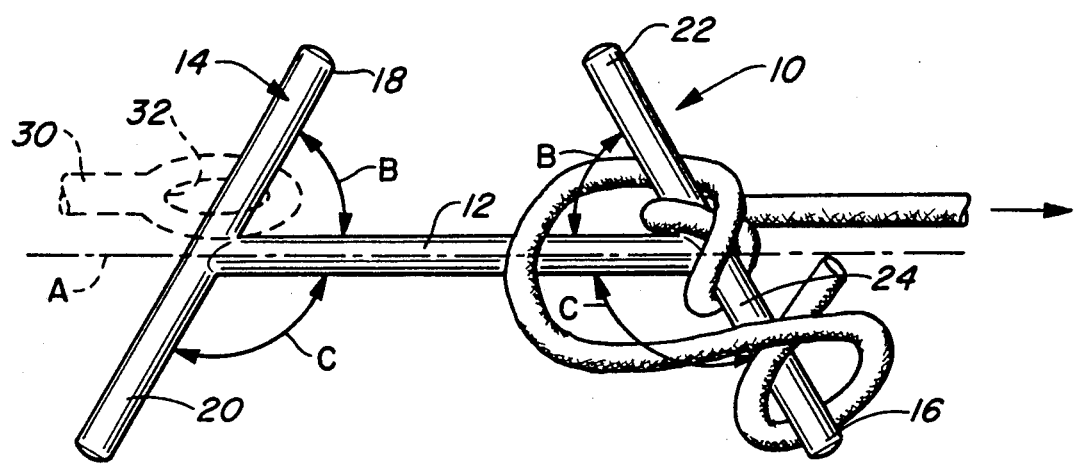
FIG._1
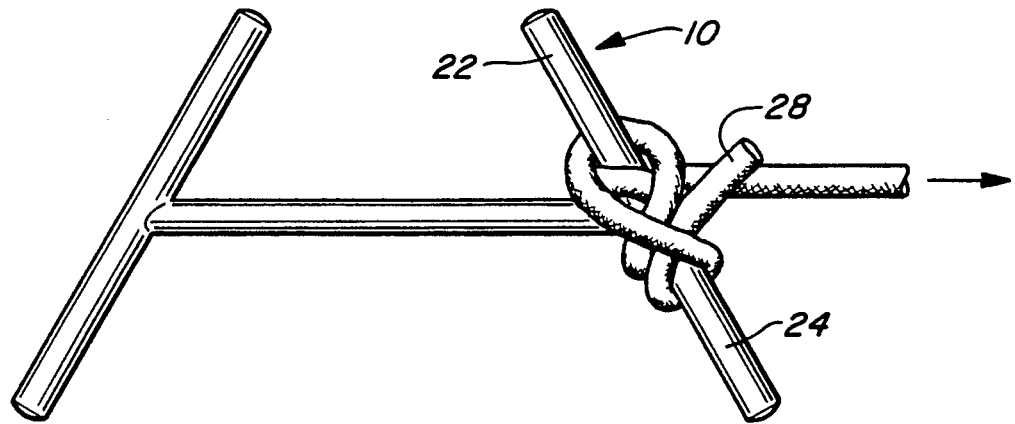
FIG._2
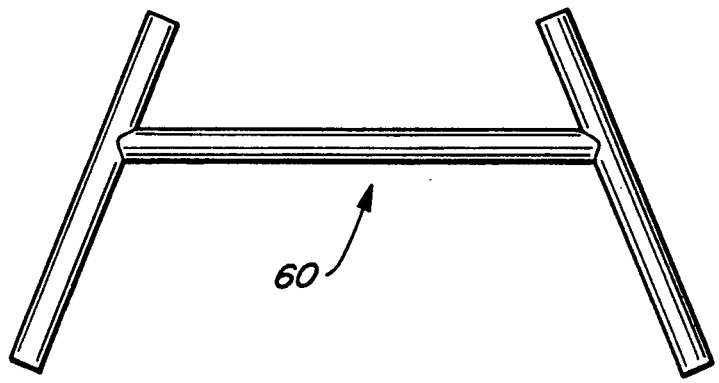
FIG._5

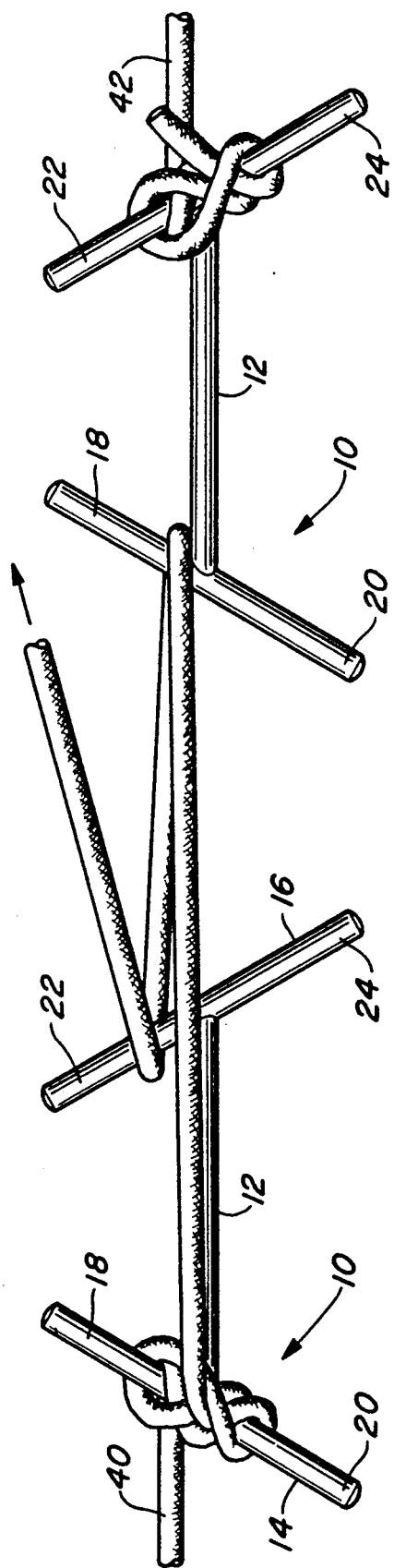
FIG._3
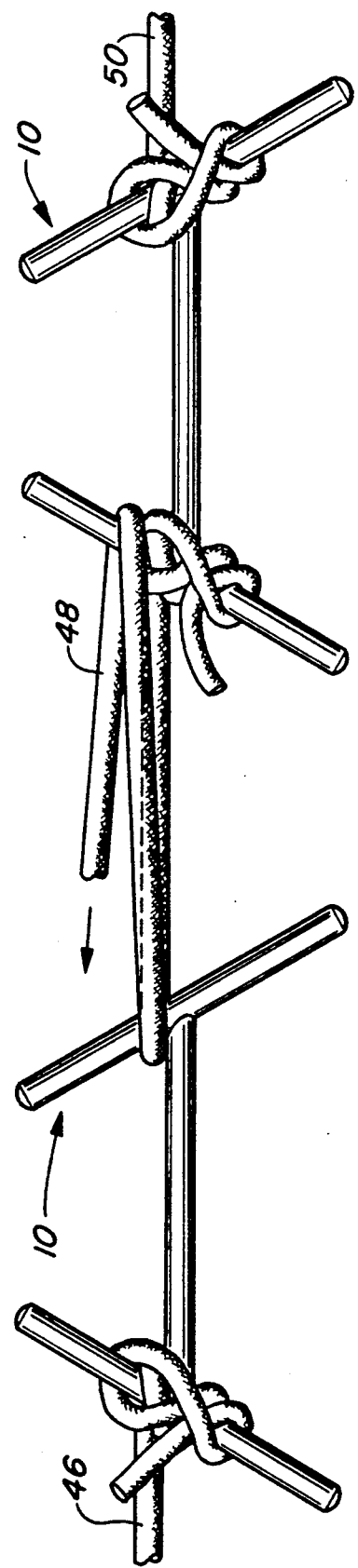
FIG._4

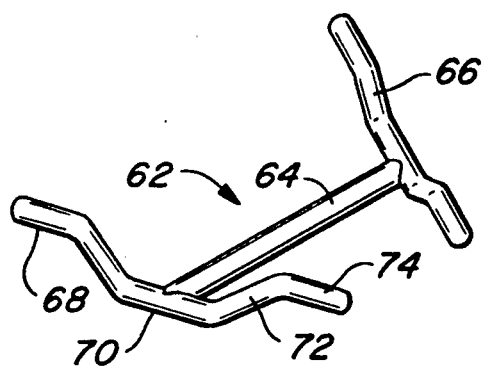
FIG._6
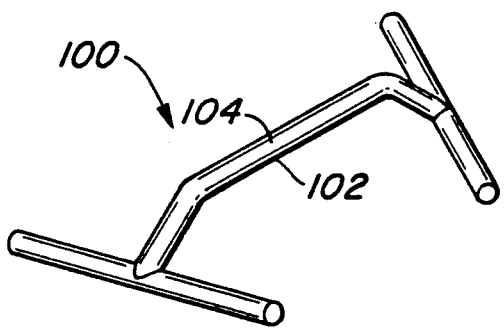
FIG._12
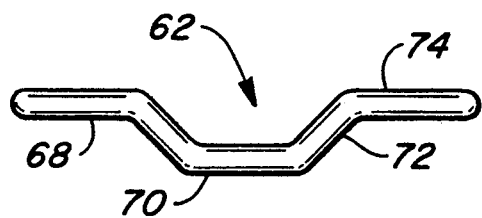
FIG._7
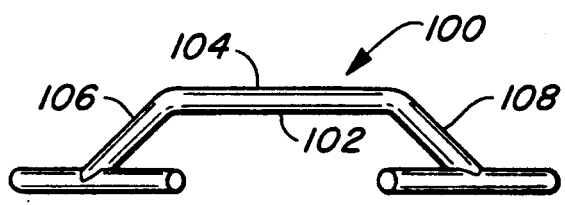
FIG._11
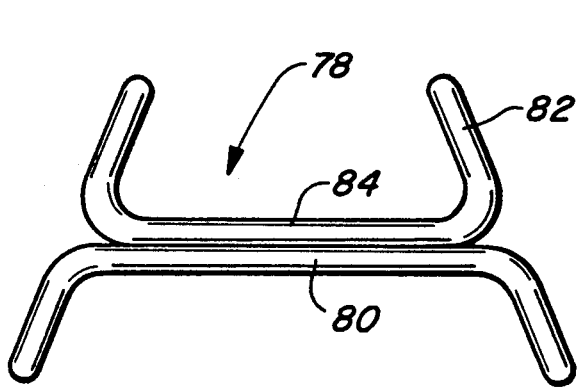
FIG._8
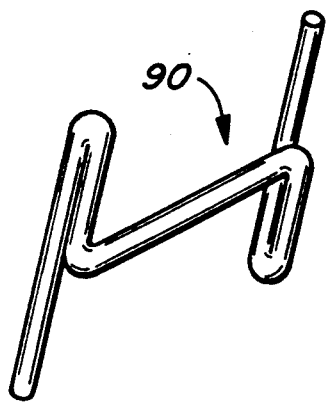
FIG._9

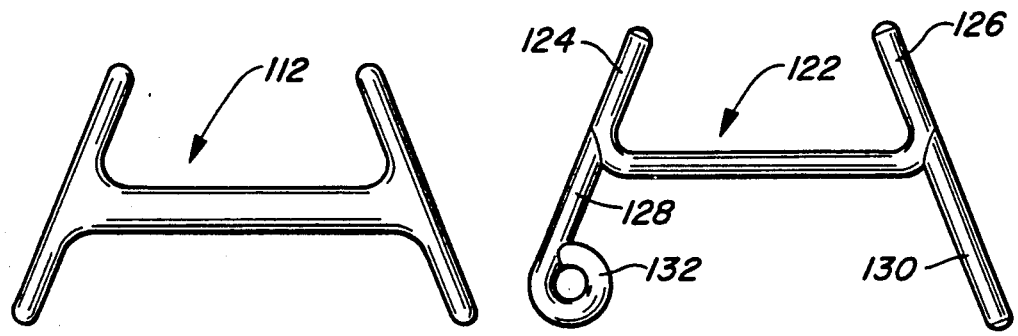
FIG._13  FIG._14
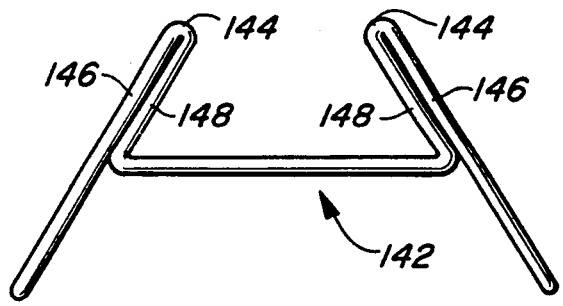
FIG._15
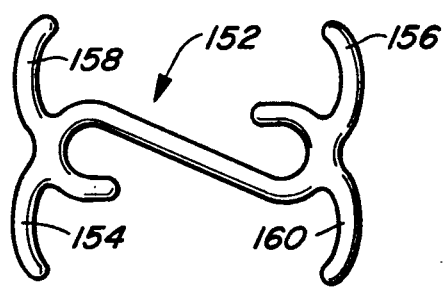
FIG._16
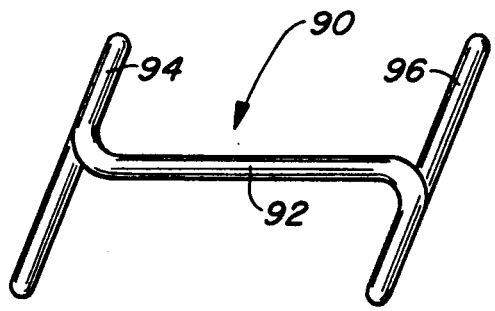
FIG._10
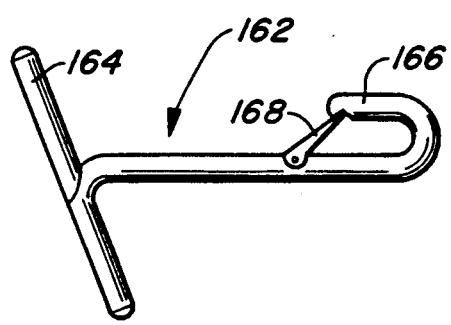
FIG._17

PORTABLE CLEAT

TECHNICAL FIELD

The present invention relates to a portable cleat which with a line may be readily utilized to secure objects and as a tie-down. Two portable cleats may also be utilized in tandem in combination with one or more lines to provide a tackle arrangement.

BACKGROUND ART

Cleats are well known expedients for securing and tying down objects. Prior art cleats come in a variety of sizes and configurations and range from simple to complex. A search conducted by applicant located four patents which are representative of the prior art. The four patents are U.S. Pat. No. 2,962,998, issued to Long, U.S. Pat. No. 3,715,782, issued to Newell, U.S. Pat. No. 3,939,793, issued to Brockelsby, and U.S. Design Pat. No. 257,421 issued to Cox.

The arrangements disclosed in the above-identified patents carry out the same function; in particular, they are devices fixed in position and providing means for retaining a line at said fixed position.

DISCLOSURE OF THE INVENTION

The cleat of the present invention, by contrast, is completely portable and may be utilized to carry out a wide variety of tasks. For example, the cleat may be employed as a tie-down or to secure objects. When two are utilized in combination with a line, the cleat can function as a simple tackle providing the user with the mechanical advantage attributed to such equipment. The portable cleat of the present invention is not only versatile, but simple and of inexpensive construction as well.

The portable cleat of the present invention includes a primary connector element having a principal axis and opposed ends. A secondary connector element is rigidly attached to the primary connector element at at least one of said primary connector element ends at a predetermined location on the secondary connector element.

The secondary connector element includes arms extending in generally opposed directions away from said predetermined location and each of the arms has a distal end spaced from the distal end of the other arm.

The arms of the secondary connector element are angularly disposed relative to the primary connector element principal axis whereby one of the arms defines an acute angle with the principal axis adjacent to the predetermined location and the other of the arms defines an obtuse angle with the principal axis adjacent to the predetermined location.

Other features, advantages, and objects of the present invention will become apparent with reference to the following detailed description and accompanying drawings.

BRIEF DESCRIPTION OF THE DRAWINGS

FIG. 1 is a plan view of a preferred form of portable cleat constructed in accordance with the teachings of the present invention and illustrating a line being secured thereto;

FIG. 2 is also a plan view of the portable cleat of FIG. 1 but showing the line secured thereto by a knot;

FIG. 3 is a plan view illustrating two portable cleats of the type shown in FIG. 1 in cooperative relationship with two lines to form a simple tackle arrangement;

FIG. 4 is a view similar to that of FIG. 3 but illustrating a somewhat different tackle arrangement defined by the portable cleats and lines;

FIG. 5 is a plan view of an alternative embodiment of the portable cleat of this invention;

FIG. 6 is a perspective view of yet another type of portable cleat;

FIG. 7 is an end view of the cleat of FIG. 6;

FIG. 8 is a plan view of yet another portable cleat embodiment;

FIG. 9 shows a portable cleat constructed from a single bent rod;

FIG. 10 is a plan view of the portable cleat of FIG. 9;

FIGS. 11 and 12 are, respectively, plan and perspective views of an embodiment of the portable cleat including a handle; and FIGS. 13, 14, 15, 16 and 17 are plan views, respectively, of yet five more alternative arrangements of portable cleats constructed in accordance with the teachings of the present invention.

BEST MODE FOR CARRYING OUT THE INVENTION

Referring now to FIGS. 1 and 2, the portable cleat constructed in accordance with the teachings of the present invention is designated generally by reference numeral 10. The cleat includes a primary connector element 12 which, in the embodiment shown, has a generally rod-like configuration. The primary connector element 12 has a principal axis A.

Connected to the opposed ends of primary connector element 12 are secondary connector elements 14, 16. The secondary connector elements 14, 16 also have a generally rod-like configuration. The primary connector element and the secondary connector elements define smooth, interconnecting, cylindrical outer surfaces. The connector elements may be constructed of any suitable material such as stainless steel, aluminum, brass, or plastic, and any suitable fabrication technique, such as welding or brazing, may be utilized to secure the connector elements together. The cleat may be cast, forged, extruded, stamped, bent into shape, or otherwise formed by known procedures, as appropriate.

As is clearly shown in the drawings, secondary connector element 14 includes arms 18 and 20 extending in generally opposed directions away from the predetermined location on secondary connector element 14 where the primary connector element attaches thereto. Similarly, secondary connector element 16 includes arms 22, 24. The distal ends of each arm are spaced from one another.

The arms of each secondary connector element are angularly disposed relative to the primary connector element principal axis A whereby one of the arms defines an acute angle with the principal axis adjacent to the location of interconnection between the primary connector element and the secondary element and the other said arm defines an obtuse angle with the principal axis adjacent to the predetermined location.

In the arrangement of FIGS. 1 and 2, arms 18 and 22 define an acute angle B with the primary axis, while arms 20, 24 define an obtuse angle C with the principal axis. Obviously, with this arrangement, the distal ends of the arms forming the acute angles are closer together than the distal ends of the arms forming the obtuse angle. In the arrangement disclosed in FIGS. 1 and 2, the primary connector element and the secondary connector elements define a generally uniplanar configuration.

FIG. 1 illustrates a line 28 being secured into position at the end of the cleat occupied by secondary connector element 16. FIG. 2 shows the line 28 knotted in final position. By deploying the line about both arms 22, 24 and primary connector element 12, the line 28 is effectively locked into place by the knot formed therein and the configuration of the cleat will prevent the line from being drawn therefrom when tension is applied to the line.

The end of the cleat occupied by secondary connector element 14 can be used for a wide variety of purposes and applications. For example, in FIG. 1, there is a phantom line showing of a member 30 defining an aperture or eye 32. In essence, arm 18 and the primary connector element 12 define a hook for the retention of member 30 when arm 18 is positioned within aperture 32.

FIG. 3 illustrates how two portable cleats 10 may be utilized in cooperation with two lines, lines 40, 42, to provide a simple tackle arrangement affording a mechanical advantage to its user. Line 40 is formed into a knot about secondary connector element 14 of the portable cleat 10 illustrated at the left of FIG. 3. The line is then looped about arm 18 of the cleat 10 on the right. The line is doubled back and looped about arm 22 of the left-most cleat as shown. An endwise force exerted on line 40 in the direction indicated by the arrow will result in an increase of the applied force as compared to the pulling force in much the same way that a conventional pulley arrangement with movable sheaves increases the applied force. The smooth outer cylindrical surface of the secondary connector element arms minimizes frictional resistance so that considerable tensional forces are applied to line 42 upon application of the illustrated endwise force on line 40.

FIG. 4 provides yet another example of the versatility of the portable cleat 10 when employed in combination with a plurality of lines, in this case, lines 46, 48, and 50. The ends of lines 46 and 50 are secured to the left and right cleats 10, respectively, as, for example, by the illustrated knots. Line 48 is secured to the left hand end of the cleat on the right of the drawing. Line 48 is then looped twice, as shown, about the adjacent arms of the cleats defining an acute angle with the principal axis of the primary connector elements. A pulling force on line 48 in the direction of the arrow causes the illustrated arrangement to function as a tackle system, thus exerting considerable tensile forces in lines 46, 50 with the application of much less force on line 48.

The portable cleat 60 shown in FIG. 5 is virtually identical to that shown in FIGS. 1-4, except that the arms forming the acute angle with the primary connector element principal axis are shorter than the arms forming the obtuse angle.

FIGS. 6 and 7 illustrate a portable cleat including a primary connector element 64 and secondary connector elements 66, 68. This embodiment differs from that of FIGS. 1-4 in that each secondary connector element is comprised of three distinct arm portions 70, 72, 74 connected together at bends. Arm portion 74, i.e. the terminal portion, is disposed on a different plane than the plane occupied by the primary connector element principal axis. This facilitates the wrapping of a line about the secondary connector element in situations where the primary connector element 64 is either in engagement with, or in close proximity to, another object. Then, too, if the portable cleat 62 were rotated sideways 180 degrees, the primary connector element 64 can readily function as a handle.

FIG. 8 shows a portable cleat 78 constructed of two separate parts 80, 82. The arms of part 82 both define acute angles with the principal axis of the primary connector element 84 while the arms of part 80 define an obtuse angle therewith. In the FIG. 8 embodiment, the primary connector element 84 is essentially twice the size of the secondary element arms. As with all other embodiments of the invention disclosed herein any suitable materials and fabrication techniques may be employed in the construction of portable cleat 78.

The portable cleat embodiment shown in FIGS. 9 and 10, i.e., cleat 90, differs from those described above in two major respects. First of all, cleat 90 is constructed from a single piece of bar-like material bent to form the primary connector element 92 and the secondary connector elements 94, 96. Another point of distinction resides in the fact that the secondary connector elements 94, 96 are essentially parallel. With this configuration, both acute and obtuse angles are formed with the principal axis of the cleat on each side of the primary connector element 92.

In the embodiment illustrated in FIGS. 11 and 12, cleat 100 has a primary connector element 102 including a substantially straight mid-portion 104 and end portions 106, 108 canted relative to the mid-portion. Each of the end portions extends between the mid-portion to a secondary connector element. This arrangement enables the primary connector element to function as a handle.

FIG. 13 shows a cleat 112 which is of essentially the same construction as the cleats of 1-4, but wherein the primary connector element has an enlarged diameter relative to the diameter of the secondary connector elements.

FIG. 14 shows a portable cleat 122 wherein the primary connector element is integral with two secondary connector element arms 124, 126. The other arms, arms 128, 130, are welded or otherwise secured to the remainder of the cleat. Arm 128 is bent over at one thereof to form an eye 132.

In FIG. 15 a portable cleat 142 is shown which is formed from a bent bar. Two of the secondary connector element arms comprise a segment of the bar bent to form at least one bight and two parallel bar segment sections. The bights are identified by reference numeral 144 and the parallel bar segment sections by reference numerals 146, 148.

FIG. 16 illustrates a portable cleat 152 wherein the secondary connector element arms are curved. An acute angle with respect to the primary connector element principal axis is formed by arms 154, 156, while an obtuse angle is formed therewith by arms 158, 160. It should be noted that arms 154, 156 are bifurcated so that each arm has two distal ends.

FIG. 17 illustrates a portable cleat 162 incorporating only a single secondary connector element 164. The other end of the primary connector element of the cleat 162 is bent to define a hook 166. A latch member 168 of any suitable construction is operatively associated with the hook 166 to selectively retain an object within the hook.

What is claimed is:

1. A portable cleat adapted for use in rigging and securing objects with a line, said portable cleat comprising in combination:

an elongate primary connector element having a principal axis and opposed ends;

a first secondary connector element rigidly attached to said primary connector element at one of said primary connector element ends at a predetermined location on said first secondary connector element and a second secondary connector element rigidly attached to said primary connector element at the other of said primary connector ends at a predetermined location on said second secondary connector element, said secondary connector elements each including arms extending in generally opposed directions away from the predetermined location thereof and each of said arms of each secondary connector element having a distal end spaced from the distal end of said other arm thereof, said arms being angularly disposed relative to said primary connector element principal axis whereby one of the arms of each secondary connector element defines an acute angle with said principal axis adjacent to said predetermined location and the other of the arms of each secondary connector element defines an obtuse angle with said principal axis adjacent to said predetermined location, one of said secondary connector elements being engageable by said line adjacent the predetermined location thereof and about the arm thereof defining an obtuse angle with said principal axis, said portable cleat and said line cooperable to exert a pulling force at the other of said secondary connector elements when said line is looped about the arm engaged thereby and pulled taut and away from said other secondary connector element, said secondary connector element arms being angularly disposed relative to said primary connector element principal axis with the defined acute angles both being on one side of the primary connector element principal axis and the defined obtuse angles being on an opposed side of the primary connector element principal axis whereby arms generally converge on said one side and generally diverge on said generally opposed side.

2. The portable cleat according to claim 1 wherein said primary connector element and said secondary connector element have a generally rod-like configuration and define smooth, interconnecting, cylindrical outer surfaces.

3. The portable cleat according to claim 1 wherein said primary connector element and said secondary connector element define a generally uniplanar configuration.

4. The portable cleat according to claim 1 wherein said primary connector element includes a substantially straight mid-portion and end portions canted relative to said mid-portion, each said end portion extending between said mid-portion to a secondary connector element.

5. The portable cleat according to claim 1 wherein said primary connector element and said secondary connector element are of unitary construction.

6. The portable cleat according to claim 5 wherein said primary connector element and said secondary connector element are in the form of a bent bar, at least one of said arms comprising a segment of said bar bent to form at least one bight and at least two parallel bar segment sections.

* * * * *